July 15, 1941.  D. F. WARNER  2,249,508.
HYDRAULIC GOVERNING MECHANISM
Filed April 26, 1939
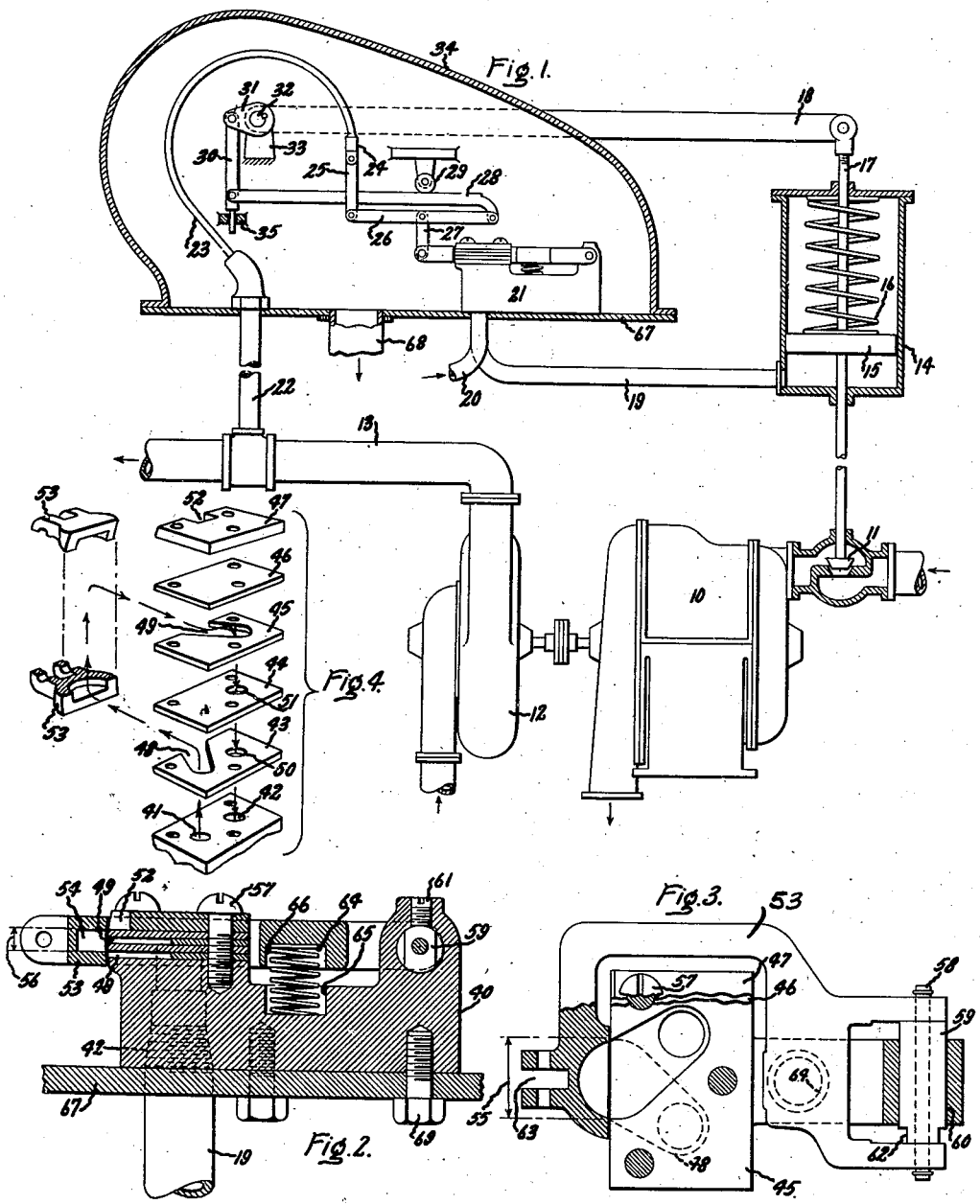
Inventor:
Donald F. Warner,
by Harry E. Dunham
His Attorney.

Patented July 15, 1941

2,249,508

UNITED STATES PATENT OFFICE

2,249,508

HYDRAULIC GOVERNING MECHANISM

Donald F. Warner, Swampscott, Mass., assignor to General Electric Company, a corporation of New York Application April 26, 1939, Serial No. 270,165

5 Claims. (Cl. 121—46.5)

The present invention relates to hydraulic governing mechanisms comprising a servo-motor and a control or pilot valve for controlling the flow of fluid under pressure to the servo-motor such as are used, for example, in connection with elastic fluid turbines to position the inlet valve thereof in response to changes of a fluid condition. More specifically, the invention relates to governing mechanisms as may be used for controlling fluid pressure of considerable magnitude. The pressure-responsive device forming part of the mechanism in these cases usually is in the form of a Bourdon tube. The work capacity of a Bourdon tube is small because such tubes possess small stroke and little directive force. The pilot valve then which is controlled by the Bourdon tube must be practically free of static and viscous friction. It also should cause small reaction to the flow of oil therethrough.

The general object of my invention is to provide an improved construction and arrangement of hydraulic governing mechanisms of the type above specified which includes a special pilot valve that may be readily controlled by the small directive force of a pressure-responsive device such as a Bourdon tube.

For a consideration of what I believe to be novel and my invention, attention is directed to the following description and the claims appended thereto in connection with the accompanying drawing.

In the drawing, Fig. 1 illustrates a hydraulic governing mechanism embodying my invention; Fig. 2 is a sectional view through the pilot valve of Fig. 1; Fig. 3 is a top view partly in section of Fig. 2; and Fig. 4 is an exploded perspective view of certain parts of Fig. 2.

The mechanism in Fig. 1 has been shown applied to an elastic fluid turbine 10 with an inlet valve 11 and arranged to drive a centrifugal type pump or compressor 12 with a discharge conduit 13. In such arrangement it is often required to maintain the high discharge pressure in the discharge conduit 13 substantially constant during variations in load. This is accomplished in accordance with my invention by means of a hydraulic governing mechanism which comprises a hydraulic motor 14 with a piston 15 biased downward by a compression spring 16 and secured to a stem 17. The stem 17 has a lower extension connected to the turbine inlet valve 11 and an upper end pivotally secured to a control or follow-up lever 18. Fluid under pressure is supplied to the hydraulic motor 14 and discharged therefrom through a conduit 19 which is connected to a fluid pressure supply conduit 20 through the intermediary of a control or pilot valve 21. Positioning of the pilot valve 21 is effected in response to changes of pressure in the aforementioned conduit 13. To this end the conduit 13 is connected by a pipe 22 to the fixed end of a Bourdon tube 23 which has a free end 24 connected by a link 25 to the left-hand end of a floating lever 26. The latter has an intermediate point connected by a link 27 to the pilot valve and a right-hand end pivotally connected to a lever 28 engaging a fulcrum 29 and having a left-hand end connected by a link 30 to the left-hand end of a short lever 31. The right-hand end of the lever 31 is fastened to a shaft 32, which latter has a portion secured to the left-hand end of the follow-up lever 18. The shaft 32 is supported on a fulcrum 33 which may be formed by the side walls of a casing 34 for the mechanism. The short lever 31 is located inside the casing 34 whereas the long lever 18 is located outside the casing 34 and has its left-hand end secured to a portion of the shaft 32 projecting through the casing side wall. As far as the operation of the mechanism is concerned, we may consider the two levers 31, 18 as a single lever held on a fulcrum 33. The lower end of the aforementioned link 30 is guided in a bearing 35. The fulcrum 29 for the lever 28 may be adjustable to vary the operation of the mechanism.

The operation of the mechanism is as follows, assuming for the present that upward movement of the link 27 causes the pilot valve to increase the restriction of the flow of fluid from the conduit 20 to the conduit 19 or disconnect the conduit, and vice versa, that downward movement of the link 27 decreases the restriction of the flow of fluid from the conduit 20 to the conduit 19. Increase in pressure in the pipe 22 which may be due to a decrease in demand for fluid under pressure from the compressor forces the free end 24 of the Bourdon tube 23 upward whereby the left-hand end of the floating lever 26 is moved up and causes upward movement of the link 27, resulting in increased restriction to flow of fluid from the conduit 20 to the conduit 19 and consequently decreasing fluid pressure in the hydraulic motor 14 whereby the piston is moved downward by the action of the spring 16 and causes closing movement of the turbine inlet valve 11. This reduces the flow of operating fluid to the turbine 10 so that the speed of the latter decreases, resulting in a decrease in pressure in the compressor discharge conduit 13. During upward movement of the left-hand end of the lever 26 by action of the Bourdon tube the right-hand end of the lever 26 remains stationary, acting as a fulcrum. Downward movement of the piston 15 of the hydraulic motor causes downward movement of the follow-up lever 18 whereby the left-hand end of the short lever 31 is moved upward, causing clockwise turning movement of the lever 28 about the fulcrum 29. The right-hand end of the lever 26 then is moved downward, causing downward movement of the link 27 and restoring of the pilot valve to its original position.

The pilot valve which forms an essential part of my invention is shown in detail in Figs. 2 to 4 and comprises a block 40 forming an inlet channel 41 and an outlet channel 42, the channel 41 being connected to the supply conduit 20 to receive fluid under pressure therefrom and the channel 42 being connected to the conduit 19. The function of the pilot valve, as described above, is to control the restriction to flow of fluid under pressure between the channels 41 and 42.

The arrangement, as best shown in Figs. 2 and 4, comprises a plurality of plates 43, 44, 45, 46 and 47. The plate 43 forms an inlet or feed port 48. The plate 45 forms a supply and discharge port 49, more specifically a port of controlled pressure which communicates with the channel 42 in the block through bores 50 and 51 in the plates 43 and 44 respectively. The upper plate 47 has a cut-off or recess 52 through which operating fluid may be drained, as will be described hereafter. During operation, fluid flows either from the feed port 48 into the supply port 45, as indicated by arrows in Fig. 4, or from the hydraulic cylinder through the discharge port 49 to the draining recess 52. The flow in either case is controlled by a movable valve member 53 which forms a pocket 54. This pocket has a horizontal width 55 equal to the total width of the ports 48, 49 and a height 56 equal to the total thickness of three of the plates 43 to 46. In the position shown in Fig. 2 the pocket 45 registers with the lower edge of the plate 44 and the upper edge of the plate 46. In this position the pocket 54 communicates with the port 49 but does not communicate with the port 48 or the draining recess 52 so that no flow of operating fluid takes place, except for leakage through the clearance between the member 53 and the valve assembly, meaning that the apparatus is in equilibrium. If the member 53 is moved downward it establishes connection between the ports 48 and 49, thus permitting the flow of fluid from the port 48 through the port 49 to the hydraulic motor. The restriction to the flow between the ports decreases as the valve member 53 is moved further down and minimum restriction to flow and accordingly maximum pressure in the hydraulic motor is attained when the lower edge of the pocket 54 registers with the upper edge of the block 42, contacting the lower edge of the feed port 48. All of the aforementioned plates 43 to 47 inclusive are securely fastened to the valve block 40 by means of screws 57. The movable valve member 53 forms an arm or lever which is hinged at its right-hand end by means including a pin 58 rotatable in an eccentrically bored sleeve 59 held in a bore 60 of the block 40. The sleeve 59 normally is held in position by a set screw 61. An extension of the sleeve outside the bearing 60 has cut-off portions 62 whereby the sleeve may be adjusted upon loosening of the set screw 61.

Positioning of the sleeve permits adjustment of the clearance between the adjacent faces of the pocket forming valve member 53 and the plates 43 to 47. The left-hand end of the movable valve member forms an opening 63 for pivotal connection with the link 27. The movable parts of the mechanism in particular the element 53 is biased by means of a spring 64 having an end portion positioned in a recess 65 of the block 40 and another end portion positioned in a recess 66 of the movable valve member. The spring eliminates error in position due to manufacture or subsequent wear of parts. The aforementioned casing 34 for enclosing the mechanism has a bottom 67 with a drain port 68. The pilot valve block 40 is secured to the bottom 67 by means of bolts 69.

During operation, increase in pressure in the conduit 13 causes, as described above, upward movement of the link 27 whereby the movable valve member 53 is moved upward and permits draining of fluid from the hydraulic motor through the conduit 19, the discharge port 49 and the drain port or recess 52. This fluid is discharged through the drain conduit 68 of the casing. Similarly a drop in pressure in the conduit 13 causes downward movement of the link 27, thus establishing connection between the ports 48 and 49 and supply of fluid under pressure from the inlet conduit 20 through the pilot valve and the conduit 19 to the hydraulic motor 14, resulting in opening of the turbine valve 11.

With this arrangement the slightest movement of the valve member 53 establishes a change of fluid pressure in the hydraulic motor. The hydraulic characteristics of this pilot valve are similar to that of ordinary pilot valves with round valve heads. The static and viscous friction of this pilot valve, however, are relatively very small as compared with those of cylindrical type valves. The only bearing friction is between the eccentric sleeve 59 and the pin 58. At this point the angular movement is slow and the leverage to overcome the friction at this point is high.

Summarizing, a hydraulic governing mechanism according to my invention comprises a pilot valve which has inlet and outlet channels for connection to a source of fluid under pressure and a hydraulic motor respectively and a movable valve member for controlling the restriction to flow of fluid between these channels. The movable valve member is pivotally connected to a floating lever which has one point connected to a Bourdon tube and another point connected to a follow-up device. All these elements are enclosed within a casing which at the same time forms a drain channel for receiving operating fluid discharged from a pilot valve drain port. The pilot or control valve itself broadly comprises a block which forms inlet and outlet channels and a laminated structure in the form of several plane plates fastened to the block and forming a feed port communicating with the inlet channel, a port of controlled pressure communicating with the outlet channel and a drain port for receiving operating fluid which under certain conditions is discharged from the outlet channel. The restriction to flow of fluid between the several ports is controlled by a movable valve member which forms a pocket in cooperative relation with the ports and is held on the block by means of an eccentric sleeve and biased by means of a spring.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. A control valve comprising a block forming inlet and outlet channels, a laminated structure having a plurality of plates secured to the block and including a first plate forming a first port in communication with the inlet channel, a second plate forming a second port in communication with the outlet channel and a third plate forming a drain port, and a movable valve member in cooperative relation with the ports to control the restriction to flow of fluid between them.

2. A control valve comprising means including a block and forming a feed port and a port of controlled pressure, a movable valve member having a portion controlling the flow of fluid between said ports, means including an eccentric bearing sleeve supporting the valve member on the block and permitting adjustment between them, and a biasing spring between the block and the valve member.

3. A control valve comprising a block forming inlet and outlet channels, a laminated structure fastened to the block and having separate plates forming two separate ports communicating with the inlet and the outlet channel respectively, a movable valve member to establish connection between the ports and to control the restriction to flow of fluid between them, and means adjustably pivoting the movable valve member on the block.

4. A control valve comprising a block forming inlet and outlet channels, a laminated structure including a plurality of plates secured to the block, one of said plates forming a feed port communicating with the inlet channel, a second plate forming a port of control pressure communicating with the outlet channel through a bore in the first plate, a third plate forming a drain port, a movable valve member in cooperative relation with the ports for controlling the restriction to flow of fluid from the feed port to the port of control pressure and from the latter to the drain port.

5. A control valve comprising a block forming two channels, a plurality of plates secured to the block and including a first plate forming a first port, a second plate forming a second port, the port in the first plate communicating directly with one of the channels, means including an opening in the first plate and an intermediate plate with an opening located between the first and the second plate to connect the second port with the other channel, and a member pivotally held on the block for controlling the communication between the first and the second port.

DONALD F. WARNER.